United States Patent [19]

Braungart

[11] Patent Number: 4,997,235

[45] Date of Patent: Mar. 5, 1991

[54] LIGHT METAL WHEEL RIM APPARATUS

[75] Inventor: Martin Braungart, Alpirsbach, Fed. Rep. of Germany

[73] Assignee: BBS Kraftfahrzeugtechnik AG, Schiltach, Fed. Rep. of Germany

[21] Appl. No.: 343,847

[22] Filed: Apr. 26, 1989

[51] Int. Cl.⁵ ............................................. B60B 25/04
[52] U.S. Cl. ................. 301/11 R; 301/63 D; 152/396
[58] Field of Search ............... 152/396, 397, 402; 301/11 R, 11 CD, 10 R, 10 DC, 63 D, 63 DS

[56] References Cited

U.S. PATENT DOCUMENTS

| | | | |
|---|---|---|---|
| 2,363,182 | 11/1944 | Hunt et al. | 301/63 D |
| 3,529,869 | 9/1970 | Casey | 301/11 R |
| 3,880,219 | 4/1975 | Mitchell | 152/404 |
| 3,885,615 | 5/1975 | Mitchell | 152/396 X |
| 3,999,588 | 12/1976 | Mitchell | 152/398 |
| 4,165,777 | 8/1979 | Sano | 301/63 D X |
| 4,363,347 | 12/1982 | Baumgartner | 152/411 |
| 4,470,637 | 9/1984 | Kopp et al. | 301/11 R |

FOREIGN PATENT DOCUMENTS 2709160 9/1978 Fed. Rep. of Germany ... 301/63 D
2824972 12/1979 Fed. Rep. of Germany .

*Primary Examiner*—Russell D. Stormer
*Attorney, Agent, or Firm*—Dick and Harris

[57] ABSTRACT

A light metal wheel rim apparatus is provided with an increased wheel disk area in proportion to the overall diameter of the rim. The light metal wheel rim is constructed of at least two component parts. A first component part includes an inner rim flange and rim ring. A second component part includes a wheel disk portion, upon which a design may be configured, and an outer rim flange. The first and second component parts are joined in a manner which maximizes the area of the wheel disc relative to the overall dimensions of the light metal wheel rim.

12 Claims, 3 Drawing Sheets

LIGHT METAL WHEEL RIM APPARATUS

BACKGROUND OF THE INVENTION

The present invention relates in general to light metal wheel rims of the kind having at least two component parts such as that disclosed in German Patent No. 28 24 972 and U.S. Pat. No. 4,363,347. In particular, the present invention relates to wheel rims having internal and external rim flanges and adjacent corner regions for seating the internal and external beads of a corresponding tubeless tire.

The present invention also relates to wheel rims assembled from two or more component parts fastened together by bolts. In such wheel rims, a first component part includes the internal rim flange, a first curved portion for seating the internal bead of the tire, the rim ring and the wheel disk. The second component part typically includes the bowl shaped external rim bed and the external rim flange. In such wheel rims, the bowl-shaped rim beds are generally formed by forging, but they may also be formed by a press; the bowl-shaped rim beds are never cut. Heat hardenable aluminum milled alloys are typically used.

One feature which is often determinative of the shape of a light metal wheel rim are the diameters and spacing between the beads of the tubeless tire to be mounted on the rim. These dimensions are, of course, determined by tire manufacturers. The dimensions of the tire beads also affect the configuration of the internal and external rim flanges.

Within the rim, space must be provided to accommodate the brake mechanism of the vehicle. Minimum safety clearances must be provided between large diameter brake mechanisms and the wheel rim.

The internal and external rim beds cannot have any openings, other than for the opening passage for the air fill valve, as is possible, for example, in the case of wheel disks. This means that any opening passages can only be provided radially inward of the rim beds, through which opening passages heat generated by the brake mechanism can be removed. In this connection, those areas of the opening passages which lie at the greatest possible radius from the center of the wheel disk are the most valuable for the purpose of heat removal, since the centrifugal force (which acts to move air out through the wheel rim) increases with the square of the distance from opening passage to the center of the wheel disk. If, for example, 10 percent of the area of the opening passages are relocated radially outwardly, then heat removal is improved, not by 10 percent, but by approximately 20 percent.

Light metal wheel rims, particularly two-part light metal wheel rims are, however, not esteemed by the public solely because of their technical characteristics. Rather, their esthetic characteristics also play an extraordinarily important role. The more aesthetically pleasing a wheel rim is, the more it will be purchased by the buying public. For the technician shaping the form, there is available only the space within the radially innermost area of the outer rim bed, because this area alone is the visible area of the wheel disk. For this reason also, it is desirable to draw a visible area of the wheel disk as close as possible to the external side of the rim, and away from the vehicle. The technician shaping the form then has a correspondingly greater surface area available with which to work.

Damage to light metal wheel rims usually occurs in the area of the external rim bed, which is expensive to manufacture. Such damage occurs, for example, from roadside stones and other hazards. For this reason, it would be advantageous to be able to replace an external rim bed. The smaller the mass of the rim bed is, and the simpler its form, the more inexpensive the rim bed is, because large complicated forms are more expensive to forge than simple and small forms. The shorter the distance is between the radially outermost and radially innermost areas of the rim bed, the greater the rigidity the bed has for a given wall thickness. Therefore, a highly convoluted or very long rim bed is in this regard disadvantageous.

The task of the invention is to describe a construction which, with regard to the above conditions, permits an optimal construction. It should also be suitable to the various material requirements between the rim bed and the rim ring/wheel disk, which typically consist of different alloys. A tire should also be able to be mounted on such a wheel rim in a conventional manner and its construction should allow it to accommodate an air fill valve. Finally, of course, the condition must be fulfilled that air tightness of the tire internal space, relative to the environment, is maintained.

SUMMARY OF THE INVENTION

The present invention provides a light metal wheel rim for tubeless tires, of the kind having at least two component parts. A first component part includes an internal rim flange, a first corner region configured as a seat for the internal bead of a corresponding tire, a rim ring portion, and a wheel disk portion including an external annular surface. A second component part has a bowl-shaped external rim bed which includes an external rim flange, and a second corner region configured as a seat for an external bead of the corresponding tire. The bowl-shaped external rim bed is substantially an extension of the rim ring portion and the wheel disk portion, and includes an internal annular flange which has a plurality of circumferentially arranged fastener holes extending through it. The first and second component parts are affixed to each other, with the external annular surface of the wheel disk portion juxtaposed to the internal annular flange of the bowl-shaped external rim bed, and held by a plurality of bolts extending through the fastener holes.

A ridge extends radially outward circumferentially from the first component part. The ridge is formed in a region of transition between the wheel disk portion and the rim ring portion, with the external annular surface externally oriented on it. The width of the ridge is sufficient to accommodate, in their entireties, the lengths of the bolts extending through the fastener holes. The radially outward crest of the ridge extends along a radius at least equal to the innermost radius of the internal bead of the corresponding tire. The plurality of bolts are arranged along a radius positioned immediately radially inward of the second corner region of the second component part. The ridge has an internal radius positioned inward of the the radius of the plurality of bolts.

In a preferred embodiment of the invention, the bowl-shaped external rim bed has a radial height of less than 6 centimeters. Alternatively, the radial height of the external rim bed is less than 5 centimeters, and preferably between 4 and 5 centimeters.

In a still further alternative embodiment of the invention, the external rim bed is configured to have a radial height of from 2 to 3 times the diameter of the beads of the corresponding tire, preferably 2.4, plus or minus 15 percent, times the diameter of the beads.

The external rim bed may be alternatively configured so as to comprise substantially exclusively the external rim flange, which extends from the seat of the external bead to a transition region adjacent the ridge.

The ridge preferably has a smooth, rounded crest. In an alternative embodiment of the invention, portions of the external annular surface and the internal annular flange define a gap therebetween to accommodate a wedge-shaped tip of an external bead.

The crest of the ridge preferably extends to a position radially outward relative to the seat of the internal bead of the corresponding tire.

The fastener holes are formed, in a preferred embodiment of the invention, as blind holes, with threaded bushings inserted in the blind holes.

DETAILED DESCRIPTION OF THE DRAWINGS

Figure 1:
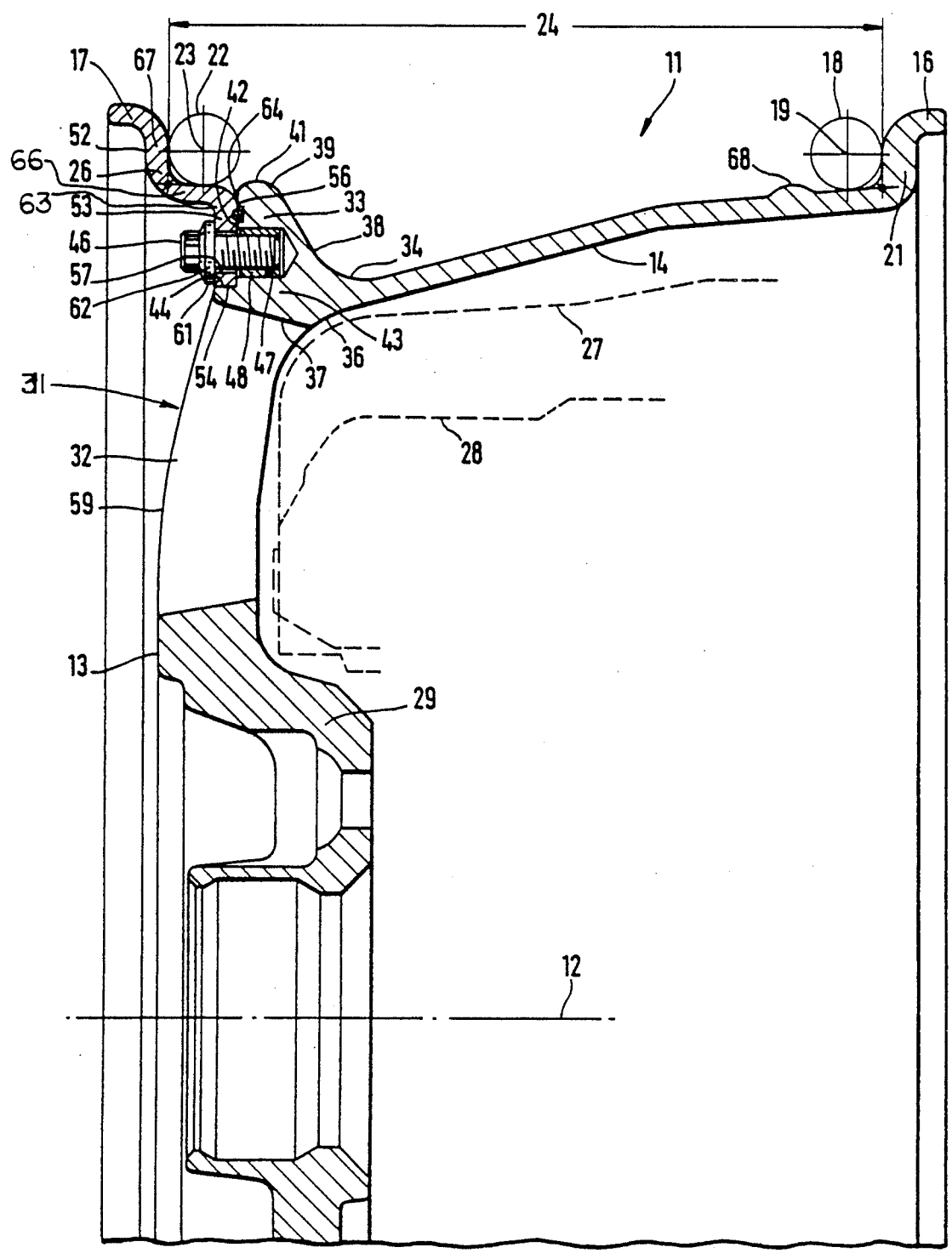
FIG. 1 is a side elevation, partly in section, of a light metal wheel rim according to the invention, showing the seating, schematically, of the internal and external beads of the corresponding tire.

While this invention is susceptible of embodiment in many different forms, there is shown in the drawings and will herein be described in detail, a specific preferred embodiment, with the understanding that the present disclosure is to be considered as an exemplification of the principles of the invention and is not intended to limit the invention to the embodiment illustrated.

Light metal wheel rim 11 has a geometrical central axis 12. Light metal wheel rim 11 comprises radially extending wheel disk 13, rim ring 14, inner rim flange 16, and outer rim flange 17. First corner region 21, represents the transition from the right area of rim ring 14 to rim flange 16, as shown in FIG. 1. First corner region 21 is configured to assist in seating and retaining inner bead 18, shown schematically in FIG. 1, of a tire (not shown).

The size and gauge of the tire is typically identified by tire manufacturers by the radius of inner bead 18 which is indicated by the perpendicular distance between central axis 12 and bead center 19. Similarly, outer bead 22, with bead center 23, lies at the same distance to the geometrical central axis 12, as does inner bead 18. The external dimension 24 of inner bead 18 to outer bead 22 amounts, in a preferred embodiment of the invention, to 6.5 inches, or 165.1 mm. Rounding 26 is configured to assist in seating and retaining outer bead 22.

The internal dimensions of light metal wheel rim 11 are determined, to a very large degree, by contour 27, which corresponds to a brake device of small diameter.

The wheel disk 13 comprises a hub area 29, which is depicted without a covering cap. Hub area 29 is connected to spokes area 31, which has various penetrating openings 32. Rim ring 14 and wheel disk 13 are formed together as a single piece. In the transition region between rim ring 14 and wheel disk 13, ridge 33 extends radially outward. The transition region includes external curved surface 34, which extends from the external surface of rim ring 14, and internal curved surface 36, which extends from the internal surface of rim ring 14 to the internal surface of wheel disk 13. Insofar as no external spoke ends are located within the area of ridge 33, external wall 37 of penetrating opening 32 proceeds at an acute angle away from internal curved surface 36. As shown in FIG. 1, internal curved surface 36 is configured so as to maintain a satisfactory clearance distance from the radius of contour 27, which as mentioned before, indicates a large diameter brake mechanism.

Ridge 33 forms both the radially directed continuation of rim ring 14 as well as of wheel disk 13. After external curved surface 34, there follows a straight flank 38 directed upwardly and to the left, and a crest 39 there connects externally at the top with this, the highest area 41 of crest 39, which lies at a slightly greater radial distance from central axis 12 (on the order of a few millimeters) than the radially innermost point of outer bead 22. In this way, inward lateral movement of outer bead 22 is partially obstructed by crest 39 to help prevent breaking of the air seal when the tire encounters sideways impacts from road hazards and the like.

On its external frontal surface, the ridge 33 bears a precisely radial, level oriented frontal surface 42, which, in the area of the base 43 of the ridge 33, makes a transition into a shoulder 44 which extends parallel to the geometrical central axis 12. External rim bed portion 52 is affixed to frontal surface 42 of ridge 33 by attachment bolts 46. Blind holes 47 are placed in ridge 33 to accommodate attachment bolts 46. Corresponding to the position and number of attachment bolts 46, more blind holes 47, are provided. Blind holes 47 open upon a radially inner area of frontal surface 42, and penetrate neither external curved surface 34 nor flank 38. Within the blind holes 47, there are located axially unmovable threaded bushings 48, which do not project over the frontal surface 42. In accordance with a wheel rim 11 having the previously described dimensions, bushings 48 would have an external diameter of 11 mm.

Somewhat radially outward of blind holes 47, narrow sealing ring groove 49 is milled into frontal surface 42, which accommodates sealing ring 51, which is of a single piece.

Outer rim flange 17 and the corner region 26 are part of external rim bed 52. External rim bed 52, in a preferred embodiment of the invention, is manufactured from an aluminum alloy which has been strengthened by being worked, for example through rolling. External rim bed 52 has a radially proceeding flange 53. Inner radius 54 of external rim bed 52 fits closely upon shoulder 44, so that force may be transferred radially from external rim bed portion 20 to wheel disk 13 through this area. The level, radial internal surface 56 of the flange 53 is pressed by the bolts 46 against the frontal surface 42 of the ridge 33. Borings 57 are placed in flange 53 to accommodate attachment bolts 46. Borings 57 have diameters substantially greater that the shafts of attachment bolts 46, so that any bending forces which might be exerted upon attachment bolts 46 are reduced to a minimum, and attachment bolts 46 are subjected only to tensile forces.

The internal surface 56 also presses the sealing ring 51 into the sealing ring groove 49. The external surface 58 of the flange 53 makes a transition into the external surface 59 of the wheel disk 13 in a substantially continuous manner. The collars 62 of the attachment bolts 46 rest on the external surface 58. The innermost area 61 of each collar 62 lies only slightly radially outwardly of the shoulder 44 or the internal radius 54, respectively. In the example of the preferred embodiment, the shoulder 44 has a distance of 166 mm from the geometrical central axis 12, and thus lies very far externally, relative to a total radius of the rim of 200 mm. The radially outward placement of shoulder 44 is a result of the increase in area of wheel disk 13, which is in turn made possible due to the provision of ridge 33, which accommodates attachment bolts 46.

From crest 39, flange 53 of external rim bed portion 20 turns away through corner region 63, by approximately 90 degrees to the outside. Between corner region 63 and the external area of the crest 39, crevice 64 is formed.

After corner region 63, there is a short, substantially coaxial-extending section 66, on the externally facing surface of which outer bead 22 is seated. The corner region 26 then forms an additional radially outward bending of approximately 90 degrees, and there then follows a short, radially extending section 67. Radially extending section 67 then makes a transition, with a comparatively large radius of a bending again amounting to approximately 90 degrees, into the external rim flange 17, or, respectively, forms the same. External rim bed 52, according to the preferred embodiment previously mentioned, measures in its radial height only 42 mm, which is very little in relation to the overall radial dimension of the wheel.

While corner regions 21 and 63 help seat inner bead 18 and outer bead 22, respectively and help prevent their lateral movement outwardly from light metal wheel rim 11, inner bead 18 and outer bead 22 must also be prevented from lateral movement inwardly, to maintain the integrity of the seal formed when the tire (not shown) is in its inflated condition. Accordingly, previously described highest point 41 of crest 39 of ridge 33, which extends radially outwardly from central axis 12 somewhat farther than does coaxially extending section 66 of external rim bed 52, helps prevent inward lateral movement of outer bead 22. Likewise, annular bump 68 is provided on rim ring 14, to help prevent inward lateral movement of inner bead 18.

Figure 2:
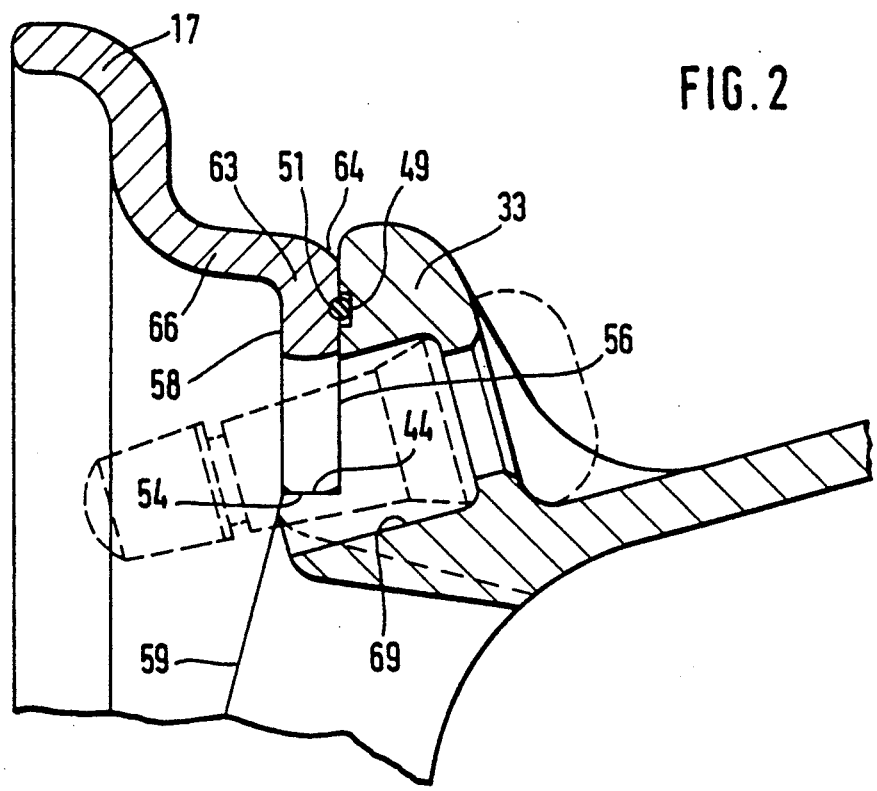
FIG. 2 is a side elevation, partly in section, of the light metal wheel rim according to FIG. 1, showing the placement and fitting of an air fill valve through the ridge and external rim bed.

According to FIG. 2, through the flange 53 and the ridge 33, a fitting boring 69 extends at an acute angle obliquely inwardly, and, as an uncongested solution for the installation of the valve depicted in dotted lines, in accordance with the specification 43 GS DIN 7780.

The solution in accordance with the invention is also suitable for valves and requires no special construction for this purpose.

Figure 3:
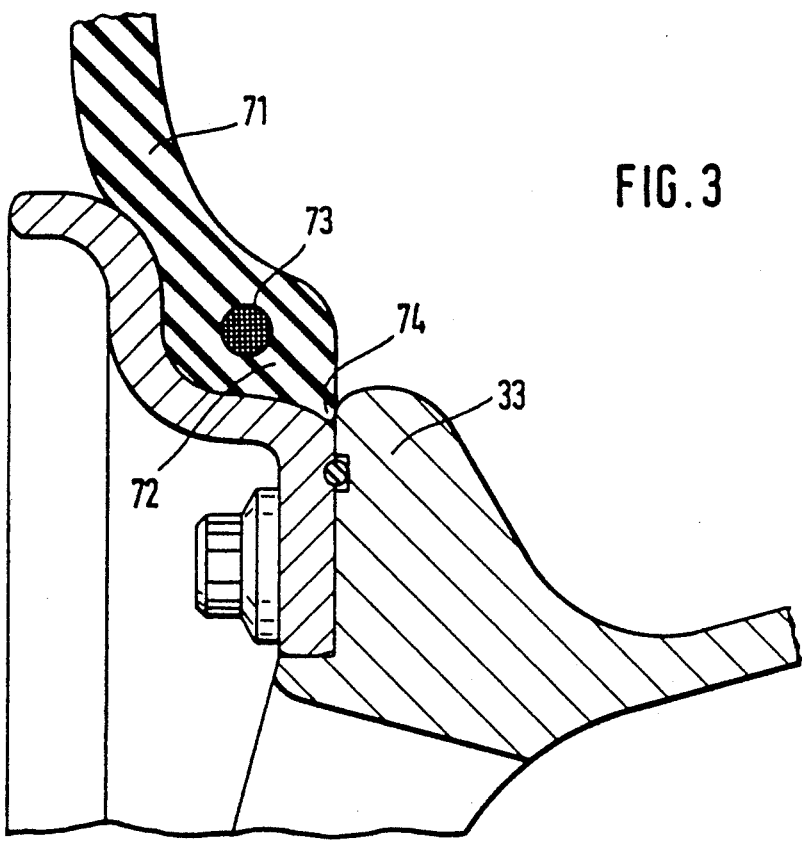
FIG. 3 is a side elevation, partly in section of the light metal wheel rim according to FIG. 1, showing the seating of an actual external bead of a tire, in particular the wedge-shaped stub region.

FIG. 3 depicts the internal are of the external tire body 71. Its base area 72 conceals the encircling chord 73. The base area 72 makes a transition into a stub unit 74, which proceeds in such a way as to become attenuated. The stub unit is, in fact, a circular ring lip. This stub unit 74 can reach into the crevice 64 and thus stabilize the tire during emergency operation.

Figure 4:
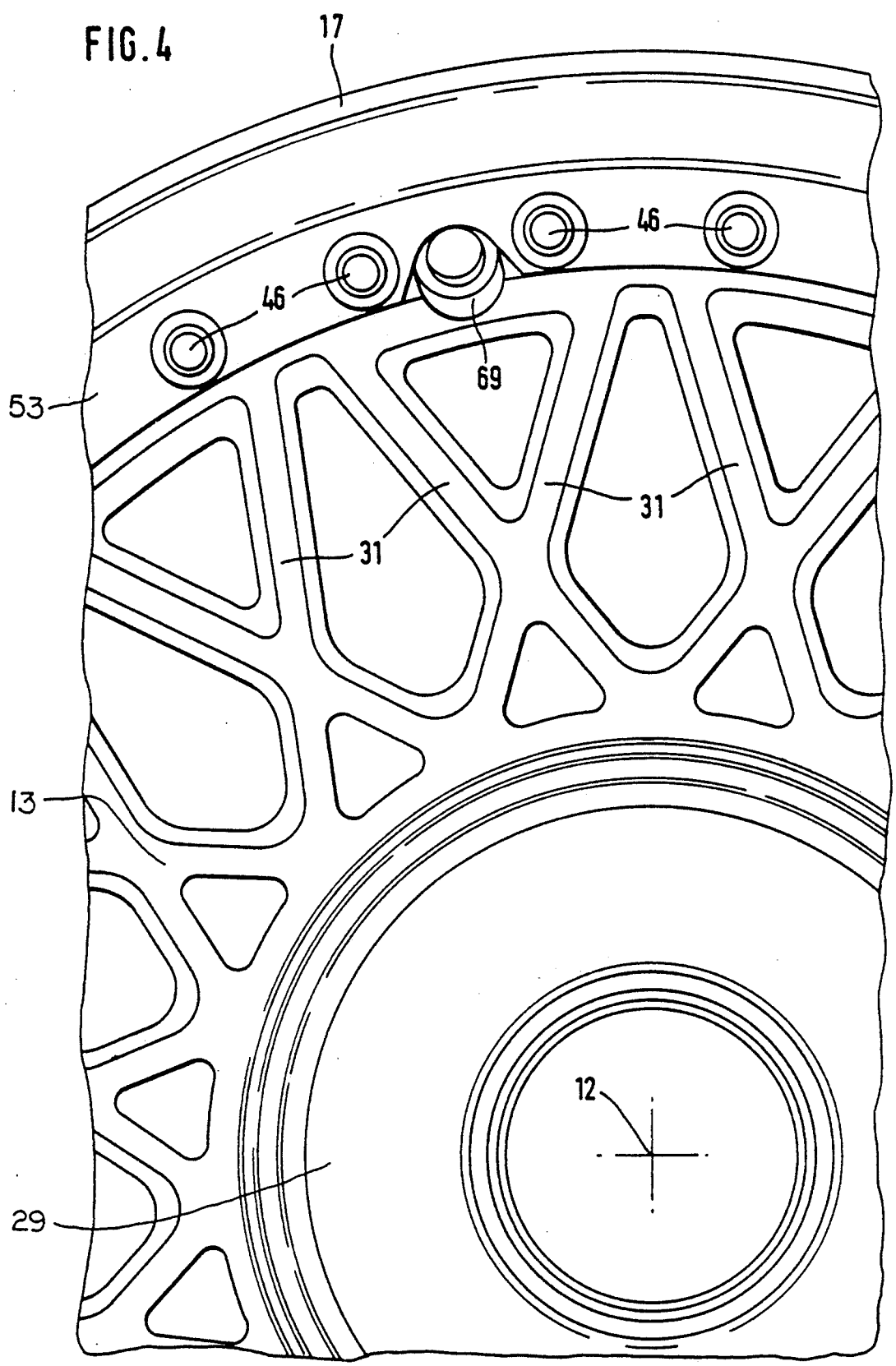
FIG. 4 is a partial front side elevation of the light metal wheel according to FIG. 1, showing the passage through the ridge and external rim bed to accommodate the air fill valve.

In FIG. 4, a section of light metal wheel rim 11 is shown in an external side view. Fitting boring 69 is seen extending through wheel disk 13. A portion of the external opening of fitting boring 69 occupies a small portion of spokes area 31 of wheel disk 13.

The foregoing description and drawings merely explain and illustrate the invention, and the invention is not limited thereto except insofar as the appended claims are so limited, as those skilled in the art who have the disclosure before them will be able to make modifications an variations therein without departing from the scope of the invention.

What is claimed is:

1. A light metal wheel rim for tubeless tires, of the kind having at least two component parts, a first component part including an internal rim flange, a first corner region configured as a seat for an internal bead of a corresponding tubeless tire, a rim ring portion, and a wheel disk portion including an external annular surface, and a second component part including a bowl-shaped external rim bed having an external rim flange and encircling a second corner region configured as a seat for an external bead of a corresponding tire, which bowl-shaped external rim bed substantially forms an extension of said rim ring portion as well as said wheel disk portion, said bowl-shaped external rim bed including an internal annular flange having a plurality of circumferentially arranged fastener holes extending therethrough; said first and second componet parts being affixed to each other, with said external annular surface of said wheel disk portion juxtaposed to said internal annular flange of said bowl-shaped external rim bed, and held by a plurality of bolts extending through said fastener holes, said light metal wheel rim for tubeless tires comprising:

a ridge, extending circumferentially around said first component part, and extending radially outwardly from a region of transition between said wheel disk portion and aid rim ring portion, said ridge having said external annular surface arranged thereon, said ridge further having a width configured to accommodate, in their entirety, the lengths of said bolts extending through said fastener holes;

a radially outward crest of said ridge extending along a radius at least equal to an inner radius of said external bead of said corresponding tire;

said plurality of bolts having arranged along a radius positioned immediately radially inward of said second corner region of said second component part; and said ridge having an internal radius positioned immediately inward of said radius of said plurality of bolts.

2. The invention according to claim 1 wherein said bowl-shaped external rim bed has a radial height of less than 6 centimeters.

3. The invention according to claim 1 wherein said bowl-shaped external rim bed has a radial height of less than 5 centimeters.

4. The invention according to claim 3 wherein said bowl-shaped external rim bed has a radial height of between 4 and 5 centimeters.

5. The invention according to claim 1 wherein said bowl-shaped external rim bed has a radial height of from 2 to 3 times the diameter of one of said beads of said corresponding tubeless tire.

6. The invention according to claim 5 wherein said bowl-shaped external rim bed has a radial height of 2.4 plus or minus 15 percent of one of said beads of said corresponding tubeless tire.

7. The invention according to claim 1 wherein said bowl shaped bed comprises substantially exclusively said external rim flange, said extensive, external rim flange bring configured to extend from said seat for said external bead of said corresponding tire to a transition region adjacent said ridge.

8. The invention according to claim 1 wherein said ridge has a smooth crest.

9. The invention according to claim 1 wherein portions of said external annular surface and said internal annular flange define a gap therebetween for accommodating a ring tip of an internal bead of said corresponding tubeless tire.

10. The invention according to claim 1 wherein said smooth crest of said ridge extends to a radially outward relative to the seat of said internal bead said corresponding tubeless tire.

11. The invention according to claim 1 wherein said fastener holes are formed as blind holes, and threaded bushings are inserted into said blind holes.

12. The invention according to claim 1 wherein said plurality of bolts are arranged radially outward of said region of transition between said wheel disk portion and said rim ring portion.

* * * * *

UNITED STATES PATENT AND TRADEMARK OFFICE
CERTIFICATE OF CORRECTION

PATENT NO.  : 4,997,235

DATED       : March 5, 1991

INVENTOR(S) : Martin Braungart

It is certified that error appears in the above-identified patent and that said Letters Patent is hereby corrected as shown below:

| | |
|---|---|
| Col. 4, Lines 39-40 | Delete "por-tion 52" and instead insert --52-- |
| Col. 4, Line 64 | Delete "bed portion 20" and instead insert --bed 52-- |
| Col. 5, Line 64 | Delete "internal are" and instead insert --internal area-- |
| Col. 6, Line 13 | Delete "cations an" and instead insert --cations and-- |
| Col. 6, Line 41 | Delete "and aid rim" and instead insert --and said rim-- |
| Col. 6, Line 49 | Delete "bolts having" and instead insert --bolts being-- |
| Col. 8, Line 4 | Delete "to a radially" and instead insert --to a position radially-- |

Signed and Sealed this

Twenty-seventh Day of October, 1992

Attest:

DOUGLAS B. COMER

*Attesting Officer*          Acting Commissioner of Patents and Trademarks

UNITED STATES PATENT AND TRADEMARK OFFICE
CERTIFICATE OF CORRECTION

PATENT NO. : 4,997,235

DATED : March 5, 1991

INVENTOR(S) : Martin Braungart

It is certified that error appears in the above-identified patent and that said Letters Patent is hereby corrected as shown below:

Col. 7, Line 8                    Delete "flange bring" and instead insert --flange being Signed and Sealed this Eighth Day of December, 1992

Attest:

DOUGLAS B. COMER

*Attesting Officer*        *Acting Commissioner of Patents and Trademarks*